Jan. 14, 1941.  J. T. MARVIN ET AL  2,228,394
BEARING STRUCTURE
Filed Nov. 12, 1938  2 Sheets-Sheet 1
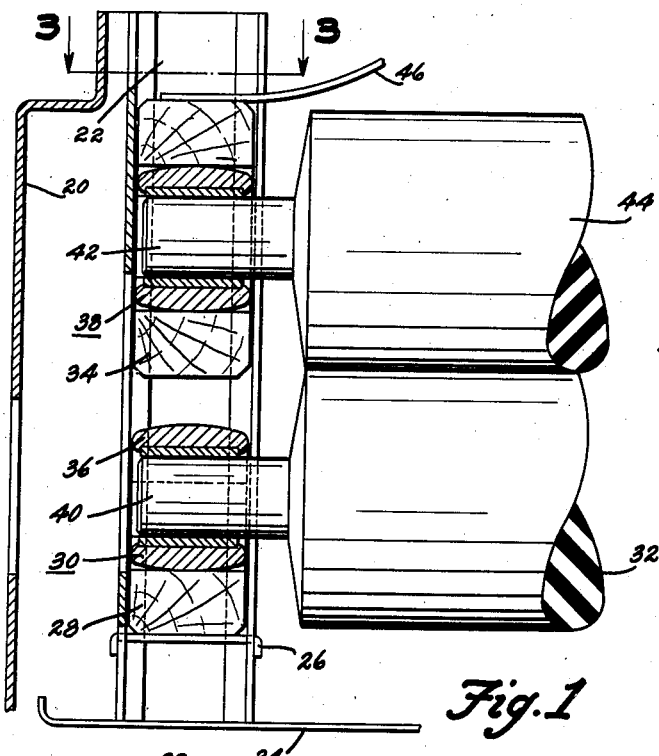
Fig. 1
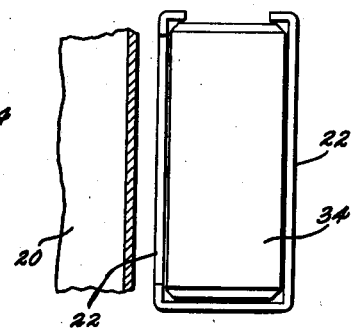
Fig. 3
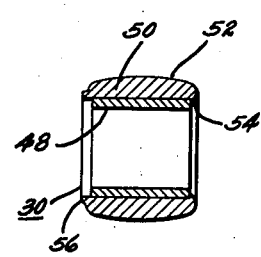
Fig. 4
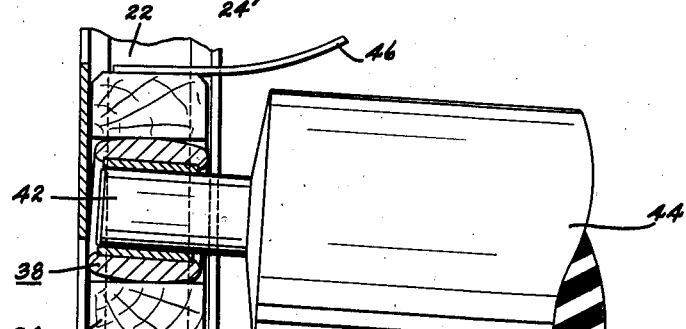
Fig. 2
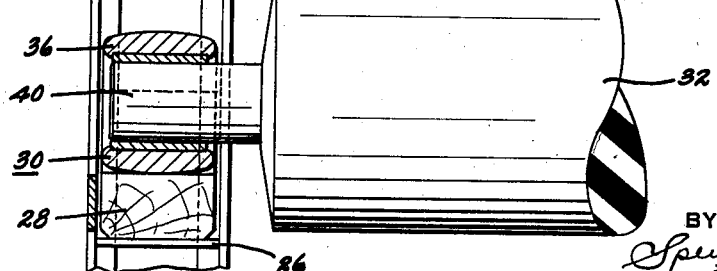
INVENTORS
John T. Marvin
and Jean A. Lignian
BY
Spencer Hardman & Fehr
their ATTORNEYS Jan. 14, 1941.  J. T. MARVIN ET AL  2,228,394
BEARING STRUCTURE
Filed Nov. 12, 1938  2 Sheets-Sheet 2
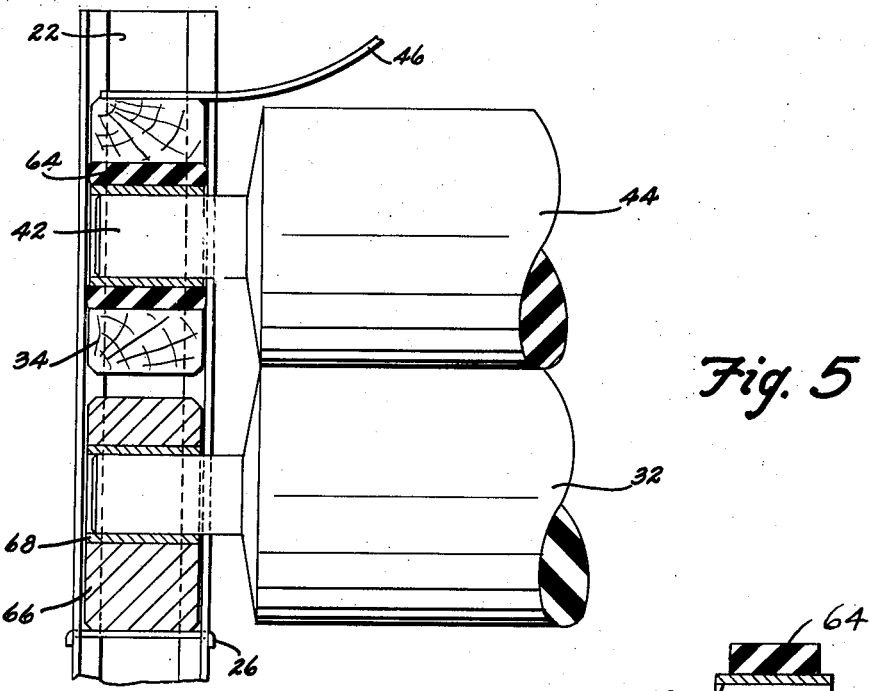
Fig. 5
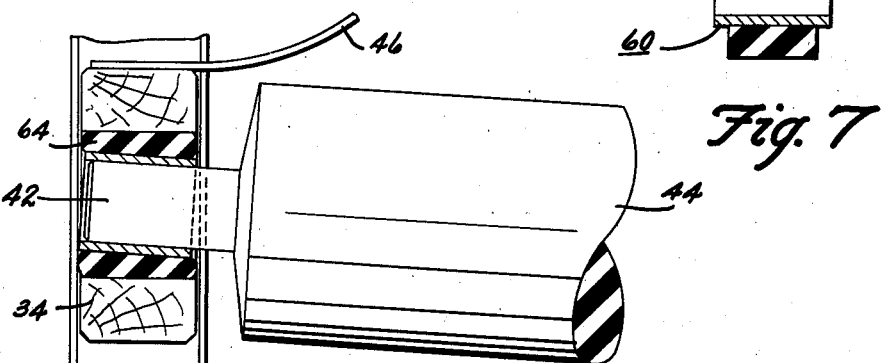
Fig. 7
Fig. 6
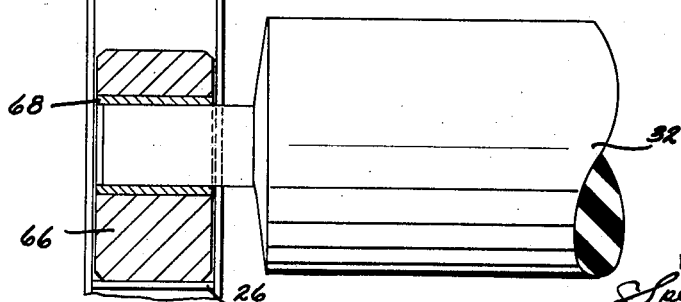
INVENTORS
John T. Marvin
and Jean A. Lignian
BY Spencer Hardman & Fehr
Their ATTORNEYS Patented Jan. 14, 1941

2,228,394

UNITED STATES PATENT OFFICE 2,228,394

BEARING STRUCTURE

John T. Marvin and Jean A. Lignian, Dayton, Ohio, assignors to General Motors Corporation, Detroit, Mich., a corporation of Delaware Application November 12, 1938, Serial No. 239,922

7 Claims. (Cl. 308—72)

The present invention relates to bearing assemblies for shafts and the like, and is particularly concerned with self-aligning bearings.

One of the objects of the invention is to provide a bearing which is freely translatable in one plane and which is simultaneously rotatable for universal movement about the center of the bearing.

In carrying out the above object it is a further object to provide a track, or elongated framework, in which a supporting member is guided so as to be slidable longitudinally of the frame, said supporting member acting as a carrier for a bearing which is universally movable around its center within the support.

In carrying out the above objects it is still a further object to provide a bearing, to be utilized in the assembly, which has a spherical outer surface thereon to permit universal movement thereof within the support, or to provide a resilient sleeve of rubber-like material, preferably vulcanized to the outer surface of the bearing, which material may be distorted to permit said universal movement when the bearing is carried in the support.

A still further object in some cases is to provide yielding means for yieldably urging the bearing support to one position in said framework whereby the bearing in its support may be moved longitudinally against means to another position if required.

Another object is to utilize the bearing assembly as hereinafter disclosed as a shaft journal for wringer rolls whereby the wringer rolls may be displaced due to the passage of an article of uneven thickness therethrough without any binding at the bearing journals thereof.

Further objects and advantages of the present invention will be apparent from the following description, reference being had to the accompanying drawings wherein preferred embodiments of the present invention is clearly shown.

In the drawings:

Fig. 1 is a fragmentary view, partially in section, of a wringer.

Fig. 2 is a view similar to Fig. 1 showing how the bearing for one of the rolls may be displaced and rotated.

Fig. 3 is a section of Fig. 1 taken on line 3—3 thereof.

Fig. 4 is a sectional view of one of the bearings utilized of the embodiment shown in Fig. 1.

Fig. 5 is a view similar to Fig. 1 showing another embodiment of the invention.

Fig. 6 is a view similar to Fig. 2 showing the displacement of one of the wringer rolls, and Fig. 7 is a sectional view of a bearing showing the outer sleeve of rubber-like material thereon as is used in connection with the embodiment shown in Fig. 5.

Referring to the drawings, Fig. 1 shows one of the embodiments of the invention as applied to a wringer roll construction wherein 20 designates the outer casing of the wringer. 22 designates a channeled track or framework which is welded or otherwise fixed to a base 24. The track 22 has a cross-member 26 therein to provide a seat for a supporting member 28 of a bearing 30 as utilized on the lower wringer roll 32. A second supporting member 34 is likewise carried within the track 22 and is freely slidable therein longitudinally thereof. Supporting members 28 and 34 are preferably made of wood or some other suitable material such as cold rolled steel, aluminum, "Bakelite," etc. Bearings 36 and 38 are carried in receiving apertures in supporting members 28 and 34 respectively and have journaled therein shafts 40 and 42 which are associated with wringer rolls 32 and 44 respectively. The wringer rolls are fabricated from some rubber-like resilient material and are tangentially engaged with one another. A spring 46 bears against the upper supporting member 34 thereby yieldably urging the associated roll 44 against the lower roll 32.

Bearings 30 and 38 include an inner bearing sleeve 48, preferably of porous bronze material, which is encased in an outer member 50 that includes a spherical surface 52 thereon. Preferably the member 50 is formed of die metal and the bushing 48 is pressed therein so as to abut a flange 54 at one end thereof. The member 50 also includes a rim or outwardly extending flange 56 at the other end thereof which may be spun over radially inwardly to hold the bearing sleeve 48 in place after the same has been inserted in the die cast member 50. The entire bearing either 30 or 38 is then placed in its wooden supporting member 28 or 34 respectively, and has the ability to rock or tilt so as to provide universal movement of the bearing within the supporting member about the center of the bearing. This universal movement may be explained by the fact that the bearing has a spherical outer surface that is only held tangentially by the supporting member thereby providing tilting of the bearing around its center.

Fig. 2 shows how the wringer rolls may be separated when an article of clothing etc. is passed therethrough adjacent only one end of the wringer rolls. In this case the entire supporting block 34 together with its supported bearing 38 is translated longitudinally upwardly within the track 22 thereby permitting a wider opening between the rolls 22 and 44 at one of the ends thereof. Simultaneous with this translatory motion of the bearing and supporting block the bearing rotates within the block and about its own center, thereby aligning the shaft and bearing preventing any binding therebetween. Spring 46 yieldably opposes the upward movement of the block 34 and when the clothing etc. has passed from between the rolls, spring 46 displaces the block 34 to its normal position, as shown in Fig. 1, and the bearing 38 simultaneously rocks to the proper position with respect to the shaft 42.

The drawings show the lower block 28 to be but a half block. It is apparent however that block 28 and block 34 may be similar if desired. In some cases the use of a self-aligning bearing such as 30 in the lower block is unnecessary.

Figs. 5 and 6 show another embodiment of the invention wherein similar results are obtained as heretofore described. The difference in this present embodiment resides in the bearing utilized. Referring to Fig. 7, a bearing 60 is shown which includes an inner bearing sleeve 62 preferably of porous bronze, having a resilient sleeve therearound preferably formed from some rubber-like material such as rubber, synthetic rubber, etc. Neoprene is preferred since such material is impervious to oil which is usually present at the bearing surfaces. The rubber sleeve 64 is preferably vulcanized to the bearing sleeve 62 although this expedient is not always necessary. The sleeve 64 is made of a greater diameter than the diameter of the receiving hole in supporting block 34 and therefore when the bearing 60 is pressed within the receiving hole the rubber is under compression and is substantially rigid against radial displacement. Such rigidity however does not prevent tilting of the bearing sleeve 62 within the rubber-like ring when the wringer roll is displaced upwardly as shown in Fig. 6, thereby permitting universal movement of the bearing sleeve 62. If desired the rubber ring and bushing may be mounted in a metal housing which may then be inserted into the receiving recess in the block.

In the present embodiment a lower supporting block 66 is utilized which has pressed therein a bearing 68. Obviously a bearing similar to bearing 60 could be utilized in the present instance if desired.

Our invention provides proper bearing journals for wringer rolls and therefore permits satisfactory operation of the wringers for a long time period. Heretofore no bearings have been provided in wringers, the shafts of the rolls merely passing through wooden blocks which wore rapidly and required constant adjustment of the wringer spring tension to obtain proper results. Furthermore the upper block carried an elongated hole to permit tilting of the shaft therein when the upper roll was displaced to permit passage of some heavy piece of clothing therethrough.

In all the embodiments it is to be understood similar bearings and framework are provided for the other end of each roll.

It is manifest that our invention can be utilized in many applications other than wringers and that the present description is limited to wringers merely for illustrative purposes. The invention is especially adapted to any application wherein translation of the bearing is required together with rotational or tilting movement thereof, and it is to be understood that the scope of this invention is sufficiently broad to embrace any such use.

While the embodiments of the present invention as herein disclosed, constitutes a preferred form, it is to be understood that other forms might be adopted, all coming within the scope of the claims which follow.

What is claimed is as follows:

1. A bearing assembly for a shaft, comprising in combination, an elongated frame member, a support member adapted to be loosely fitted within said frame member and longitudinally slidable therein, and a bearing carried by said support and capable of universal movement about its center in its supported position whereby the bearing is capable of simultaneous rotation and translatable movement relative to the frame member.

2. A bearing assembly for a shaft, comprising in combination, an elongated frame member, a support member adapted to be loosely fitted within said frame member and longitudinally slidable therein, yielding means urging said support toward one limit of its movement in said frame, and a bearing carried by said support and capable of universal movement about its center in its supported position while simultaneously being capable of translatable movement longitudinally of said frame member.

3. A bearing assembly for a shaft, comprising in combination, an elongated supporting framework, and a bearing member loosely guided in said framework, said bearing member being freely translatable longitudinally within said framework, and capable of being simultaneously freely rotatable about its own center.

4. A bearing assembly for a shaft, comprising in combination, an elongated frame member, a support member adapted to be loosely fitted within said frame member and longitudinally slidable therein, and a bearing including a substantially spherical outer surface thereon and carried by said support so as to be capable of rotational movement about its center in said support, and simultaneously being capable of longitudinal movement within said frame member.

5. A bearing assembly for a shaft, comprising in combination, an elongated frame member, a support member adapted to be loosely fitted within said frame member and longitudinally slidable therein, and a bearing including an outer sleeve of resilient rubber-like material and disposed within an opening in said support so that the rubber sleeve is under compression whereby the bearing is capable of universal movement about its center due to the resiliency of the rubber-like material and simultaneously being capable of longitudinal movement within said frame member.

6. A bearing assembly for a shaft, comprising in combination, an elongated frame member, a support member adapted to be loosely fitted within said frame member and longitudinally slidable therein, a spring acting on said support whereby the support is capable of movement within the frame upon compression of said spring, and a self-aligning bearing carried by said support, said self-aligning bearing being capable of simultaneous translatory and rotational movement.

7. A bearing assembly for a shaft, comprising in combination, a metallic track, a block held within said track and guided thereby for longitudinal movement therein, and a bearing carried in said block so as to be capable of universal tilting motion about its center, whereby the bearing is self-aligning with respect to the shaft and simultaneously freely translatable longitudinally within the track.

JOHN T. MARVIN.
JEAN A. LIGNIAN.